United States Patent Office 3,702,278
Patented Nov. 7, 1972

3,702,278
NONSLIP FIBREGLASS SURFACE
Derek Lionel William Fitzgerald, South Hants Marine, Chandler's Ford, England
Filed Sept. 29, 1970, Ser. No. 76,579
Claims priority, application Great Britain, Sept. 29, 1969, 47,718/69
Int. Cl. B32b 3/10, 3/14, 3/30
U.S. Cl. 161—5  4 Claims

ABSTRACT OF THE DISCLOSURE

A boat deck of glass-reinforced resin including a gelcoat thereon, grooves in the upper surface filled with strips of antislip material and a wood grain pattern visible through such gelcoat.

---

Figure 1:
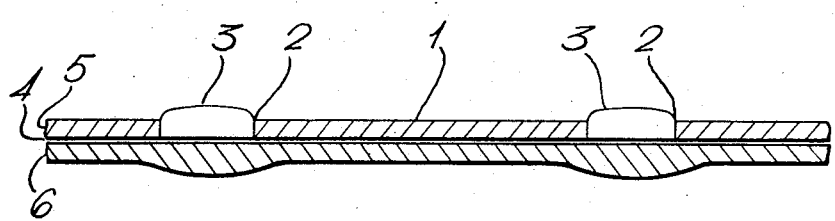

This invention relates to boat decks having reinforced plastic surfaces with nonslip properties.

Reinforced plastic laminates are widely used in the manufacture of moulded boat decks or in providing the upper surface of decks constructed from other materials such as wood, metal or even concrete. Conventionally such plastic laminates are constructed using a smooth mould onto which is applied a gelcoat of polymerisable material, for example a polymerisable monomer, followed, usually after partial curing of the gelcoat, by application of glass fibre together with further polymerisable material.

Such moulded laminates usually possess surfaces which are highly glossy and have a low coefficient of friction which is highly undesirable and may be dangerous when used for boat decks.

Although it is possible to increase the coefficient of friction of such surfaces by providing an irregular gelcoat surface either by moulding or by subsequently applying granular material in an adhesive composition, I have now found that this problem can be dealt with particularly effectively by providing strips of a material having antislip properties inlaid into grooves in the glossy tread surface of the laminate.

According to the present invention therefore, I provide reinforced synthetic resin laminates in the form of boat decks or boat deck surfaces and having strips of antislip material inlaid into grooves in the tread surface thereof.

The polymerisable material used to form the gelcoat and for adhesion of the glass fibre laminates is preferably a composition polymerising to form a polyester resin, e.g. a polyester formed between glycerol and a dicarboxylic acid such as phthalic acid.

The antislip material hereinafter referred to as the nonslip material, is conveniently inlaid in strips, for example in a regular array of substantially parallel lines. Naturally the spacing of the discrete areas should be close enough to allow the foot to contact a part of the nonslip material in any position.

Reinforced plastic laminates, when required for the decks of yachts, are often designed to resemble a laid deck constructed of caulked wood planks by incorporating a natural or imitation wood veneer showing the wood grain through the gelcoat. In this case the nonslip material conveniently may be laid in strips to imitate the caulking and may thus, for example, be coloured black and curved to follow the shape of the hull as in a laid deck. It is thus possible to impart non-slip properties to such a plastic deck without losing the close resemblance to a wooden deck.

The nonslip material may comprise any convenient high-friction materials for example sand, stone chippings, silicon carbide granules, crushed rock etc. Granular materials such as sand are conveniently bonded with a resin, for example that used for the gelcoat.

It is possible to spread a glue or resin in the recessed areas and to apply granular material electrostatically. This method ensures that the sharp edges of the granules, e.g. of sand or graphite chippings, remain uppermost to provide a particularly rough surface.

A nonslip material of choice, particularly where strips of nonslip area are desired, is a flexible tape having an abrasive surface, for example one of the type marketed by the Minnesota Mining and Manufacturing Company under the name Safety Walk tape. Tapes of this kind are particularly suitable for simulating caulked decks and have the advantage of being readily handled and laid in position during manufacture of the deck.

The nonslip material may be incorporated into the surface of the reinforced plastic laminate moulding either by applying the material to grooves or recessed areas moulded into the surface initially, or, especially conveniently, by placing the nonslip material on the surface of the mould prior to the application of the initial gelcoat, thus using the nonslip inlays themselves to form the grooves or recesses into which they are set, in place of the corresponding raised strips or other areas which must be provided on the mould surface in order to produce a grooved or recessed moulding.

The nonslip areas may be flush with the surface of the moulding or may stand slightly proud of the surface. The nonslip properties of the surface will usually be improved if the nonslip areas protrude slightly above the surface but this is by no means essential.

The reinforced laminates surface may form an integral part of a moulded boat deck, that is to say, the moulded deck may be initially formed with appropriate grooves or with inlaid nonslip strips. It is also possible, however, for the laminate to be in the form of thinner sheets which are not strong enough in themselves to form a boat deck but can be applied as a surface laminate to existing boat decks made of other materials such as wood, metal, concrete or reinforced plastics.

Where integral to the boat deck itself and moulded with grooves it is often convenient to allow the raised areas on the mould to push the laminate into corresponding raised areas behind each of the grooves thereby creating a corrugated laminate having increased strength.

In order that the invention may be well understood the following examples are given by way of illustration only.

EXAMPLE 1

A conventional mould is prepared for forming a moulded boat deck. The mould is treated with a release agent (wax and polyvinyl alcohol) and a caulking pattern of black abrasive tape (Minnesota Mining and Manufacturing Company: Safety Walk tape) is applied thereto with the abrasive side downwards. The glecoat comprising marine polyester resin, an accelerator and catalyst in the usual proportions is then applied in layers to the mould, incorporating a simulated wood-grain lamina between the layers, and allowed partially to cure before the glass fibre is laid onto the mould. The moulding is then allowed to cure for 7 days at 60° F., removed from the mould and dewaxed. The nonslip areas then form the simulated caulking of a "teak" laid deck.

EXAMPLE 2

A mould is prepared for forming moulded boat decks having a caulking pattern of grooves created by raised lines on the mould.

After the fibreglass moulding is complete and removed from the mould the recesses which form the caulking pattern seams are dewaxed. The area surrounding the seams is covered with a protective masking tape and a mixture of polyester resin and silicon carbide is spread into the seams. The masking tape is then removed, leaving a simulated effect of a teak laid deck incorproating black nonslip seams.

EXAMPLE 3

A moulding is prepared and the seams dewaxed as in Example 2. A waterproof glue is spread into the seams, e.g. rubber solution or similar adhesive, and with the aid of an electrostatic device, granules of sand or silicon carbide are fired into the seam. This system tends to keep the sharp points of the granules on the walking surface.

One boat deck according to the invention is now described by way of illustration only with reference to the accompanying drawings in which:

FIG. 1 represents a sectional view of a part of a reinforced polyester boat deck according to the invention.

In FIG. 1 a fibreglass boat deck is provided with parallel grooves 2. The grooves 2 are filled with a rubber adhesive 3 containing silicon carbide granules raised above the deck surface to prevent slipping. A wood veneer 4 is incorporated in the fibreglass structure between the gelcoat 5 thereof and the glass fibre reinforcing layer 6.

I claim:

1. A boat deck formed from glass-reinforced polyester resin having a gelcoat thereon; means in said deck exhibiting the color and grain pattern of wood and visible through said gelcoat; grooves in the upper surface of said deck; and strips of anti-slip material inlaid in said grooves, said antislip material being of a color and arrangement to simulate caulking between portions of wood decking.

2. A deck as claimed in claim 1 in which the said antislip material is in the form of a flexible tape carrying abrasive particles.

3. A deck as claimed in claim 1 in which the antislip material is in the form of abrasive particles bonded into the said grooves by means of a resin.

4. A deck as claimed in claim 3 in which the abrasive particles are sand, stone chippings, crushed rock or silicon carbide granules.

References Cited

UNITED STATES PATENTS

| | | | |
|---|---|---|---|
| 2,131,571 | 9/1938 | Rinehart | 94—5 |
| 2,216,250 | 10/1940 | Nelson | 94—5 |
| 2,246,898 | 6/1941 | Sayre | 94—5 |
| 3,334,555 | 8/1967 | Nagin et al. | 94—5 X |
| 2,816,853 | 12/1957 | Meyers | 156—222 |
| 2,942,701 | 6/1960 | Pope | 52—630 X |

FOREIGN PATENTS

| | | | |
|---|---|---|---|
| 824,247 | 11/1959 | Great Britain | 156—279 |

WILLIAM A. POWELL, Primary Examiner

U.S. Cl. X.R.

94—5; 156—242, 293, 298, 303.1; 161—162, 164, 168, 413